United States Patent Office 3,687,692
Patented Aug. 29, 1972

3,687,692
FLAVORING COMPOSITIONS AND PROCESSES
Alan O. Pittet, Atlantic Highlands, and Eugene W. Seitz, Middletown, N.J., assignors to International Flavors & Fragrances Inc., New York, N.Y.
No Drawing. Filed Sept. 3, 1970, Ser. No. 69,505
Int. Cl. A23l 1/26
U.S. Cl. 99—140 R        12 Claims

ABSTRACT OF THE DISCLOSURE

Proline-cyclic-α-diketone reaction products, their use in processing and compositions for altering the flavor and increasing the long-term flavor acceptability and persistence of various foodstuffs, flavoring compositions, tobacco, imitation tobacco, replacements thereof, and imparting desirable flavor and aroma notes to these products as well as packaging materials for same; and, in addition, the use of the said reaction products as odorants and for altering the aroma of perfume compositions and for imparting certain aroma "notes" to perfume compositions.

THE INVENTION

The present invention relates to novel proline cyclic-α-diketone reaction products and their use in compositions for altering the flavor and increasing the long-term flavor acceptability and persistence of various materials such as foodstuffs, flavoring compositions, tobacco, imitation tobacco and the like and for imparting desirable flavor and aroma notes to these products as well as producing materials for these products as well as the processes for preparing these novel reaction products.

The present invention also relates to the use of the novel proline cyclic-α-diketone reaction products in perfumery materials for altering the aroma of a synthetic or natural perfume or for imparting an additional note to a perfume composition containing synthetic and/or natural materials.

The chemical name "proline" is intended to signify a chemical compound of the structure:

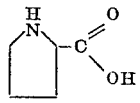

This compound, having an asymmetric carbon atom, may be either "dextrorotatory," "laevorotatory," or may be a raceimc mixture of dextrorotatory and laevorotatory isomers, and such isomers or mixtures thereof are contemplated within the scope of this invention. Thus, the term "proline" signifies, alone or in combination, "L-proline" or "D-proline" or "DL-proline."

The term "α-diketone" encompasses "α-diketones" per se, α-enolone isomers thereof, and mixtures of same.

The term "reaction product" is intended herein to mean the product produced by means of a chemical reaction between one or more α-diketones and a proline, prior to addition to a material, the aroma or flavor character of which is to be altered, or a product produced in situ by separate addition or by addition in non-reacted condition of each of the reactants (e.g. a proline and one or more α-diketones) to the material, the aroma or flavor character of which is to be altered or imparted.

The term "alter" in its various forms is used herein to means supplying or imparting a flavor character or note to an otherwise bland, relatively tasteless substance or augmenting the existing flavor characteristic where a natural flavor is deficient in some regard, or supplementing the existing flavor impression to modify its quality, character or taste.

The term "foodstuff" as used herein includes both solid and liquid ingestible materials which usually do but need not, have nutritional value. Thus, foodstuffs include dairy products such as butter, milk, cream and the like, breadstuffs, crackers, popcorn, cereal products, pretzels, sweeteners capable of supplying light, fruity caramel, toffee-like flavor notes, maple, honey and sweet scorched notes. Thus, such foodstuffs may be provided in the form of convenience foods, beverages, candies, cereals, soft drinks, snacks and the like.

Due to the tremendous consumption of foodstuffs, there has been an increasing interest in substances and methods for imparting flavors to foodstuffs. This interest has been stimulated not only because of the inadequate quantity of natural flavoring materials available, but perhaps even more importantly, because of the need for materials which can combine several nuances, will be more stable than natural materials, will blend better with other flavors or flavoring composition components, and will generally provide superior products.

It has recently been suggested that proline reaction products are useful in foods and other consumable materials and particularly for purposes of imparting flavor to breadstuffs and related products.

In accordance with one aspect of the invention relating to the flavor for foodstuffs, it has been found that a composition containing a reaction product obtained by treating at elevated temperature a mixture of proline and at least one cyclic α-diketone is capable of imparting a wide variety of organoleptic characteristics to foodstuffs including the lengthening of the time that the foodstuff has an acceptable flavor. Such a reaction product is particularly valuable as an additive for reproducing the flavor and aroma characteristics of cereal, such as cereals derived from wheat, rice and the like, crackers, popcorn, rice and the like as well as supplying certain desirable fatty toasted notes normally missing in heated, i.e., lightly browned, butter, butterscotch and the like. Depending in part upon the concentration of the reaction product and the type of cyclic α-diketone precursor employed, the reaction product may also be used to supply sweet, honey-like aroma and flavor notes, such as is characteristic of Graham crackers, or sweet burnt notes reminiscent of the toasted sweet notes of bread crumbs frying in butter at the foaming-up stage before it has subsided and burned, or light fruity notes such as caramel, maple and the like and flavor notes having a definite sweet milk cream character. The product is particularly useful in flavoring breadstuffs and in imparting baked goods aroma to paper products used for packaging baked goods such as bread. The term breadstuffs as used herein means any of the dough or dough-like products including without limitation, bread, cake, rolls, crackers, cookies, muffins and the like.

It is well known in the tobacco art that the domestic tobaccos which are exemplified by burley, Maryland, flue-cured, bright leaf or Virginia tobaccos are low in flavor as compared with so-called oriental or aromatic tobaccos which are imported from Turkey, Greece, Bulgaria, Yugoslavia, Rhodesia and Russia. Accordingly, it has been common practice in the tobacco industry to prepare blends of domestic and oriental tobaccos in order to provide cigarettes which have desired flavor and aroma characteristics. This invention also provides a tobacco which has an enhanced flavor and aroma.

Furthermore, this invention also provides a flavored replacement for tobacco, prepared by substituting for tobacco dried lettuce leaves, cabbage leaves and the like, and adding a flavoring composition thereto which composition contains one or more proline-α-diketone reaction products.

The flavoring and aroma imparting additives of the present invention may be prepared by reaction of proline with at least one flavorant comprising a cyclic-α-diketone having reactive dicarbonyl functions of which the following are illustrative, but by no means limitative:

Maltol
2-hydroxy-3-methyl-2-cyclopenten-1-one (3-methyl cyclopentane-1,2-dione) (also referred to hereinafter as "Cyclotene")
4-hydroxy-2,5-dimethyl-2(H)-furan-3-one
Ethyl maltol
3-Ethyl-2-hydroxy-2-cyclopenten-1-one (referred to hereinafter as "Ethyl cyclotene")
4-hydroxy-5-methyl-2(H)-furan-3-one
2-hydroxy-3-propyl-2-cyclopenten-1-one or mixtures thereof.

The cyclic α-diketone may be selected from a relatively wide range of material provided such compound is capable of reacting with proline to form an ingestibly acceptable flavorant.

To promote intimacy of ingredient contacting as well as good heat transference, it is preferred to carry out the reaction in a liquid vehicle or solvent, preferably a food grade vehicle, such as cooking oil, propylene glycol and water and the like. It is additionally preferred that the solvent food-grade vehicle also act as a solvent for the reaction product, this being found to maximize retention of the more volatile components present in the reaction medium which might otherwise be lost. The reaction product is preferably provided in the form of a homogeneous solution, thereby facilitating its use in precise quantities in the foodstuff or flavoring composition.

The cyclic α-diketones prescribed for use herein are further advantageous in that they possess, per se, appealing flavor characteristics and thus, may be allowed to remain in the reaction product mixture, thereby obviating any necessity for separation and recovery of the reaction product in pure form and thus eliminating the associated cost which might otherwise accrue. Thus, the unreacted cyclic α-diketone blends with the flavor of the reaction product to provide an effective flavoring additive.

The reaction is preferably carried out within a temperature range of 50° C. to 200° C. with a temperature of 100° C. to 150° C. being preferred. The proline is used in amounts sufficient to yield on a mole basis with respect to the cyclic α-diketone a ratio within the range of 0.1 to 20 with a range of 0.5 to 5 being preferred. Moreover, to capitalize on the beneficial flavorant properties characterizing each of a plurality of cyclic α-diketones, the latter may be employed in admixtures comprising two or more in forming the reaction product.

Although not particularly critical, the quantity of reactants employed may be such as to provide a concentration of from 1% to 30% by weight of solvent vehicle.

The cyclic α-diketones described herein are known compounds and are available commercially. Particularly preferred are the hydroxy furanones, i.e., 2,5-dialkyl-4-hydroxy-2(H)-furan-3-ones of the formula:

$$\text{HO} \underset{R \diagdown_O \diagup R_1}{\overset{=O}{\rule{1cm}{0.4pt}}}$$

wherein R and $R_1$ are the same or different alkyl, and desirably lower alkyl of 1–6 carbon atoms, with alkyl groups of 1–3 carbon atoms being preferred. Particularly preferred for use herein is the compound 2,5-dimethyl-4-hydroxy-2(H)-furanone-3. This product has been isolated from pineaple juice and is found to have a strong fruity fragrance. Alternatively, this material can be prepared according to the method described in copending U.S. patent application Ser. No. 10,275, filed Feb. 10, 1970, which comprises reacting dihalo-diketone of the formula:

$$\text{R}-\text{CHX}-\overset{\overset{O}{\|}}{\text{C}}-\overset{\overset{O}{\|}}{\text{C}}-\text{CHX}-\text{R}$$

wherein X represents halogen and R has the significance given hereinbefore, with an aqueous alkali metal or alkaline earth metal hydroxide at a temperature of about 75° C. to 125° C.

When the reaction products of the present invention are used in a flavoring or a flavor-enhancing composition, they can be combined with conventional flavoring auxiliary materials including flavorants such as organic acids such as fatty, saturated, unsaturated and amino acids, alcohols, including primary and secondary alcohols; esters, carbonyl compounds including ketones, diketones and aldehydes; lactones; other cyclic organic materials including benzene derivatives, alicyclics, heterocyclics such as furans, pyridines, pyrazines and the like; sulfur-containing materials including thiols, sulfides, disulfides and the like; proteins; lipids; carbohydrates; so-called flavor potentiators such as monosodium glutamate, guanylates and inosinates, natural flavoring materials such as cocoa, vanilla and caramel; artificial flavoring materials such as vanillin, and the like.

It will be appreciated that the types and amounts of compounds selected from the foregoing groups of materials will depend upon the precise organoleptic character desired in the finished product and, especially in the case of flavoring compositions used to enhance other flavors, will vary according to foodstuffs to which flavor and aroma are to be imparted. Inorganic materials such as sodium chloride and freshness preservers such as butylated hydroxyanisole and propyl gallate can be added for their adjuavnt or preservative effects on the flavoring composition.

The L-proline, cyclic α-diketone reaction product can be combined with one or more flavoring auxiliary materials such as a vehicle or carrier for adding them to the particular product. As previously indicated herein, the vehicle in some instances may be included as a component of the reaction medium, e.g., propylene glycol, oils, shortening and baking fats, water and the like. Other suitable carriers include gum arabic, carrageenen, other gums and the like.

The reaction product can be incorporated with the carriers by conventional means such as spray-drying and the like. Such carriers can also include materials for coacervating the L-proline, cyclic α-diketone reaction product to provide encapsulated products. When the carrier is an emulsion, the flavoring composition can also contain emulsifiers such as mono- and diglycerides of fatty acids and the like. With these carriers or vehicles, the desired physical form of the composition can be prepared.

It will be understood by those skilled in the art that the reaction products of the present invention can be added to the materials to be flavored at any convenient point in the production of the finished product. Thus, when the L-proline, cyclic α-diketone reaction product is used to alter or otherwise vary the flavor of foodstuff, they can be added to the original mixture, dough, emulsion, batter, or the like prior to any cooking or heating operation. Alternatively, they can be added at a later stage of processing in volatilization losses would be excessive during the early processing period.

The L-proline, cyclic α-diketone reaction product is utilized in small but effective quantities sufficient to impart the desired flavor characteristic to the product. However, the use of excessive amounts of such reaction product is not only wasteful and uneconomical, but in some instances, an excess thereof may tend to unbalance the flavor or other organoleptic property of the foodstuff being prepared. Thus, the precise quantity employed will vary depending upon the ultimate foodstuff, the quantity of flavor present initially in the product; the further process or treatment steps to which the product will be subjected; regional and other preference factors; the type of storage, if any, to which the product will be subjected; and the pre-consumption treatment, such as baking, frying, and so on given to the product by the ultimate consumer.

In accordance with recommended practice, it is preferred that the ultimate composition contain from 0.5 to about 500 p.p.m. of reaction product. More particularly in food compositions it is desirable to use from about 1 to about 100 p.p.m. and in certain preferred embodiments of the invention from about 3 p.p.m. to about 60 p.p.m. of the L-proline, cyclic α-diketone reaction product. The amount of L-proline, cyclic α-diketone reaction product utilized in flavoring or flavor-enhancing compositions can be varied over a wide range depending upon the particular quality to be added to the foodstuff or other consumable material.

The reaction products of this invention are also useful individually or in admixture as fragrances. They can be used to contribute a powerful caramel-like sweet "baked" fragrance. As olfactory agents, the reaction products of this invention can be formulated into or used as components of a "perfume composition."

A perfume composition is composed of a small but effective amount of a reaction product of this invention and an auxiliary perfume ingredient, including, for example, alcohols, aldehydes, ketones, nitriles, esters, and frequently hydrocarbons which are admixed so that the combined odors of the individual components produce a pleasant or desired fragrance. Such perfume compositions usually contain (a) the main note or the "bouquet" or foundation-stone of the composition: (b) modifiers which round-off and accompany the main note: (c) fixatives which include odorous substances which lend a particular note the perfume throughout all stages of evaporation, and substances which retard evaporation, and (d) top-notes which are usually low-boiling fresh smelling materials.

In perfume compositions the individual component will contribute its particular olfactory characteristics, but the overall effect of the perfume composition will be the sum of the effect of each ingredient. Thus, the individual reaction product of this invention, or mixtures thereof, can be used to alter the aroma characteristics of a perfume composition, for example, by high-lighting or moderating the olfactory reaction contributed by another ingredient in the composition.

The amount of the reaction product of this invention which will be effective in perfume compositions depends on many factors, including the other ingredients, their amounts and the effects which are desired. It has been found that perfume compositions containing as little as 2% of the compounds of this invention. or even less, can be used to impart a scent odor to soaps, cosmetics, and the other products. The amount employed can range up to 50% or higher and will depend on considerations of cost, nature of the end product, the effect desired on the finished product and the particular fragrance sought.

The reaction products of this invention can be used alone or in a perfume composition as an olfactory component in detergents and soaps; space odorants and deodorants; perfumes; colognes; toilet waters; bath preparations such as bath oil and bath salts; hair preparations such as bath oil and bath salts; hair preparations such as lacquers, brilliantines, pomades, and shampoos; cosmetic preparations such as creams, deodorants, hand lotions, and sun screen powders such as talcs, dusting powders, face powder, and the like. When used as an olfactory component of a perfumed article, as little as 0.01% of one or more of the reaction product will suffice to impart powerful caramel-like sweet "baked" odor. Generally, no more than 0.3% is required.

In addition, the perfume composition or fragrance composition can contain a vehicle or carrier for the reaction product alone or with other ingredients. The vehicle can be a liquid such as alcohol, glycol, or the like. The carrier can be an absorbent solid such as a gum or components for encapsulating the composition.

With reference to the aspect of this invention which concerns tobacco flavoring or imitation tobacco flavoring, the proline-cyclic-α-diketone reaction product or products of this invention are added to tobacco or imitation tobacco in amounts to provide generally a tobacco, or imitation tobacco, in which is dispersed about 0.01 to about 1.0 percent by weight of the additive. Preferably the amount of additive is between about 0.05 and about 0.50 percent by weight in order to provide tobacco, or imitation tobacco, having a desired flavor and aroma. The preferred percentages may be somewhat less, however, if other flavorants imparting a desired aroma are also employed. The additives may be applied in any suitable manner and preferably in the form of a liquid solution or suspension by spraying, dipping or otherwise. The additives may be incorporated at any step in the treatment of the tobacco or imitation tobacco, but are preferably added after aging, curing and shredding and before the tobacco or dried lettuce leaves, cabbage leaves and the like is formed into tobacco, or imitation tobacco products such as cigarettes, cigars and the like. Likewise, it will be apparent that only a portion of the tobacco, or imitation tobacco be treated and the thus treated tobacco, or imitation tobacco may be blended with other tobacco or tobacco-like materials before the tobacco products are formed. In such cases, the tobacco, or imitation tobacco treated may have the additives in excess of amounts about indicated so that when blended with other tobaccos or tobacco-like materials the final product will have the percentage within the indicated range.

In accordance with an example of this invention, an aged, cured and shredded domestic burley tobacco is sprayed with a 2 percent (by weight) ethanol solution of the reaction product of proline and 4-hydroxy-2,5-dimethyl-2(H)-furan-3-one in an amount to provide a tobacco composition containing 0.005 percent by weight of the said product on a dry basis. Thereafter the alcohol is removed by evaporation and the tobacco is manufactured into cigarettes by the usual techniques. The cigarette when treated as indicated has a desired and pleasing aroma which is detectable in the main and side smoke streams when the cigarette is smoked; and this aroma contains a desirable note described by some smokers as a fruity winelike note.

At lower concentrations the reaction products of this invention have been found to improve the overall natural flavor and aroma of Virginia tobacco, for example.

It will be particularly apparent that the manner in which the reaction products of this invention are applied to the tobacco, or imitation tobacco is not particularly important since, as indicated, it may be done in the form of spraying or dipping, utilizing suitable suspensions or solutions of the reaction product. Thus, water or volatile organic solvents, such as alcohol, ether, propylene glycol, acetone, volatile hydrocarbons and the like may be used as the carrying medium for the additive while it is being applied to the tobacco, or imitation tobacco. Also, other flavor and aroma producing additives, such as those disclosed in Jones U.S. Pat. No. 2,766,145 and Schumacher U.S. Pat. No. 2,978,365, may be incorporated into the tobacco or imitation tobacco with the additives of this invention.

While this invention is useful in the manufacture of cigarette tobacco, or imitation tobacco, it is also suitable for use in connection with the manufacture of pipe tobacco, cigars and other tobacco products or imitation tobacco products formed from sheeted tobacco dust or fines or formed from ground dried lettuce leaves or cabbage leaves which are well known to the art. Likewise, the additives of the invention can be incorporated with materials such as filter tip materials, seam paste, packaging materials and the like which are used along with tobacco and imitation tobacco to form a product adapted for smoking. Where the reaction products of this invention are added to certain tobacco substitutes of natural or synthetic origin the term "tobacco" as used throughout this specification also is meant to include any composition intended for human consumption by smoking or otherwise, whether composed of tobacco plant parts or substitute materials or both.

The following examples are given to illustrate embodiments of the invention as it is presently preferred to practice it. It will be understood that these examples are illustrative, and the invention is not to be considered as restricted thereto except as indicated in the appended claims.

EXAMPLE 1

A mixture comprising the following ingredients:

| Ingredient: | Amount (grams) |
|---|---|
| L-proline | 1.0 |
| 4-hydroxy-2,5-dimethyl-2(H)-furan-3-one | 1.0 |
| Wesson Oil [1] | 10.0 |

[1] A cottonseed oil available commercially from the Wesson Oil and Snowdrift Co.

was heated and stirred. The temperature rises to 125° C. over a 10 minute period, whereupon a slurry consisting of a clear yellow solution and a brown residue forms.

The odor of the slurry is reminiscent of Graham crackers, i.e., a sweet honey-like note and definite cracker note.

EXAMPLE 2

A mixture comprising the following ingredients:

| Ingredient: | Amount (grams) |
|---|---|
| L-proline | 0.3 |
| 4-hydroxy-2,5-dimethyl-2(H)-furan-3-one | 0.3 |
| Crisco shortening [1] | 3.3 |

[1] A hydrogenated vegetable oil commercially available from Procter and Gamble Co. of Cincinnati, Ohio, disclosed in U.S. Pat. 2,634,213.

was heated to 125° C. over a 10 minute period. The shortening melted and became golden yellow. The furan compound dissolved completely while the L-proline partially browned and partially dissolved.

The odor of the reaction product was reminiscent of bread.

EXAMPLE 3

A mixture comprising the following ingredients:

| Ingredient: | Amount (grams) |
|---|---|
| L-proline | 1.0 |
| 4-hydroxy-2,5-dimethyl-2(H)-furan-3-one | 2.0 |
| Crisco shortening [1] | 20.0 |

[1] A hydrogenated vegetable oil commercially available from Procter and Gamble Co. of Cincinnati, Ohio, disclosed in U.S. Pat. 2,634,213.

was blended until uniform and then heated in a conical flask from room temperature to 140° C. over a period of 15 minutes and held at this temperature for 10 minutes.

There was obtained a slurry consisting of an orange-light brown solution with a considerable amount of sediment. The slurry possessed an aroma reminiscent of corn, although this note was weak. In addition, the slurry had a definite sweet flavor.

EXAMPLE 4

A mixture comprising the following ingredients:

| Ingredient: | Amount (grams) |
|---|---|
| 4-hydroxy-2,5-dimethyl-2(H)-furan-3-one | 0.25 |
| L-proline | 2.0 |
| Propylene glycol | 20.0 | was combined and heated in an Erlenmeyer flask. The furan compound rapidly dissolved and the L-proline material dissolved somewhat more slowly to yield a clear golden yellow solution. The temperature of the reaction mixture was raised to 105° C. for a period of 5 minutes and then the mixture was allowed to cool.

The reaction product was judged to have a good balance of corn and sweet-burnt notes.

EXAMPLE 5

A mixture comprising the following ingredients:

| Ingredient: | Amount (grams) |
|---|---|
| L-proline | 2.0 |
| Propylene glycol | 25.0 | was blended together and heated in an Erlenmeyer flask on a hot plate. Initially, a colorless solution was obtained which changed to a light golden color on further heating. When the temperature had reached 145° C., 0.25 g. of 2,5-dimethyl-4-hydroxy-2(H)-furan-3-one was added and heating was stopped and the reaction mixture was transferred to a stoppered bottle. The flavor of this mixture is judged to be slightly weaker than that of the product of Example 4 with more cereal and corn notes.

EXAMPLE 6

A composition comprising the following ingredients:

| Ingredient: | Amount (grams) |
|---|---|
| Ethyl maltol | 0.3 |
| L-proline | 2.0 |
| Propylene glycol | 20.0 | was heated in an Erlenmeyer flask to 140° C. from 25° C. over a period of 3 minutes and maintained at 140° C. for an additional 2 minutes. The mixture was transferred to a stoppered bottle to cool. The material has a more burnt sugar character and is fruitier than the material of Example 4 and possesses a distinctive cracker cereal note.

EXAMPLE 7

A composition comprising the following ingredients:

| Ingredient: | Amount (grams) |
|---|---|
| Maltol | 0.3 |
| L-proline | 2.0 |
| Propylene glycol | 20.0 | was heated from a temperature of 25° C. to a temperature of 170° C. in an Erlenmeyer flask over a period of 7 minutes and thereupon transferred to a bottle and stoppered. The flavor has popcorn and cracker notes together with a sweet creamy milk character.

EXAMPLE 8

A composition comprising the following ingredients:

| Ingredient: | Amount (grams) |
|---|---|
| Cyclotene | 0.25 |
| L-proline | 2.0 |
| Propylene glycol | 20.0 | was heated from a temperature of 25° C. to a temperature of 120° C. over a period of 7 minutes as described in Example 7. The material has a sweet scorched burnt sugar note.

EXAMPLE 9

A composition comprising the following ingredients:

| Ingredient: | Amount (grams) |
|---|---|
| Ethyl cyclotene | 0.3 |
| L-proline | 2.0 |
| Propylene glycol | 20.0 | was heated from room temperature to a temperature of 155° C. over a period of about 8 minutes. The material has caramel rum toffee-like notes and is heavier in total character than the reaction product of Example 4.

EXAMPLE 10

A white bread dough mix is prepared by mixing 1350 gm. wheat flour and 800 ml. water. To the mix is added:

| Ingredient: | Amount (grams) |
|---|---|
| Yeast | 27 |
| NaCl | 67.5 |
| Sucrose | 54 |
| Shortening | 54 |
| Non-fat dry milk powder | 40.5 |
| Yeast food (Arkady) manufactured by Fleischmann, Div. of Standard Brands | 0.50 |
| Softening agent (succinylated mono glycerides) manufactured by Kraft Div. of National Dairy Products Corporation | 3.4 |

Six grams of the product obtained in Example 2 by reacting L-proline with 4-hydroxy - 2,5 - dimethyl-2(H)-furan-3-one are added to the dough. The dough is then mixed for 8 minutes and allowed to rise for 45 minutes at 40° C.

The dough is then baked for 45 minutes at 210° C. The breadstuff product obtained has a flavor note reminiscent of the crust of home made Italian bread and has acceptable and persistent flavor properties for a period of one week and has good flavor characteristics when spread with margarine. By way of contrast, breadstuffs similarly prepared but omitting the proline-cyclic-α-diketone reaction product have a flat taste, show typical flavor deterioration on storage for a period of one week and require an expensive butter spread to provide an acceptable flavor.

Similar results are obtained when the foregoing example is repeated but employing in equivalent quantities the proline-cyclic-α-diketone reaction products of Examples 1 and 3–9.

EXAMPLE 11

A lavender-type perfume composition is prepared by admixing the following ingredients:

| Ingredient: | Amount (parts by weight) |
|---|---|
| Benzyl acetate | 50 |
| Bois de Rose oil | 70 |
| Petitgrain oil | 30 |
| Terpinyl acetate | 100 |
| Spike Lavender Spanish | 200 |
| Lavindin oil | 300 |
| Rosemary | 50 |
| Coumarin | 30 |
| Musk xylene | 40 |
| Oakmoss absolute, green | 40 |
| Vetivert oil bourbon | 50 |
| Reaction product of proline and ethyl maltol as produced in Example 6 | 2 |
| Diethyl phthalate | 68 |
| | 1000 |

The foregoing mixture is given a powerful caramel-like sweet "baked" base note because of the addition thereto of the two parts of proline-ethyl maltol reaction product produced by the process of Example 6.

EXAMPLE 12

A butter flavor mixture comprising the following ingredients is prepared:

| Ingredient: | Amount (grams) |
|---|---|
| Propylene glycol | 85.025 |
| Benzaldehyde | 0.125 |
| Oil of lemon | 0.25 |
| Butyl butyryl lactate | 2.5 |
| Diacetyl | 3.0 |
| Ethyl butyrate | 4.0 |
| Butyric acid | 4.0 |
| Product obtained in Example 4 by reacting L-proline with 2,5 - dimethyl-4-hydroxy-2(H)furan - 3 - one | 0.3 |

The addition of the 0.3 part of L-proline - 2,5 - dimethyl-4-hydroxy-2(H)-furan - 3 - one reaction product changes the character of the flavor from a "fresh" to a "cooked lightly browned." If three parts of the reaction product is used in place of 0.3 part, the character of the flavor is described as "butterscotch."

EXAMPLE 13

An imitation butter popcorn flavored concentrate containing the 2 - hydroxy - 3 - methyl - 2 - cyclopenten-1-one (Cyclotene)-proline reaction product produced in Example 8 in an amount of 0.6% by weight is formulated as follows:

| Ingredient: | Amount (parts by weight) |
|---|---|
| Propylene glycol | 704.5 |
| 2-acetyl pyrazine | 0.5 |
| Benzilidene acetone | 3.0 |
| Cinnamic aldehyde | 4.0 |
| Heliotropin | 5.0 |
| Valeric acid | 6.0 |
| Cinnamyl butyrate | 9.0 |
| Ethyl butyrate | 10.0 |
| Benzodihydropyrone | 12.0 |
| Vanillin | 40.0 |
| Lactic acid | 50.0 |
| Butyric acid | 100.0 |
| Diacetyl | 50.0 |
| Reaction product of Example 8 | 6.0 |

EXAMPLE 14

A "corn chip" snack item is produced as follows:

The solution of Example 13 is sprayed onto a bland corn-based chip in order to give an approximate level of 0.04% by weight. The resulting product is then air dried before testing by a flavor evaluation panel. A majority of the flavor evaluation panel prefers the treated chips having a buttered popcorn-flavor and aroma.

EXAMPLE 15

The following is prepared:

| Ingredient: | Amount (parts by weight) |
|---|---|
| Reaction product of Example 4 | 2.0 |
| Benzaldehyde | 10.0 |
| Vanillin | 15.0 |
| Heliotropin | 0.5 |
| β-Ionone | 5.0 |
| Cinnamyl aldehyde | 3.0 |
| Coumarin | 5.0 |
| Propylene glycol | 59.5 |

This material is applied to shredded Virginia tobacco at the rate of 0.25% by weight of formulation. The resulting mixture has a fruity, wine-like topnote with a heavier baked goods base note.

EXAMPLE 16

A "Foin Coupe" perfume composition is prepared by admixing the following ingredients:

| Ingredient: | Amount (parts by weight) |
|---|---|
| Acetophenone | 70 |
| Benzyl acetate | 70 |
| Linalool | 300 |
| Lavender | 150 |
| Bergamot oil | 40 |
| Sage sclaree, French | 20 |
| Geranium Bourbon | 50 |
| Benzophenone | 50 |
| Musk xylol | 20 |
| Oakmoss absolute, green | 5 |
| Sandalwood oil | 15 |
| Patchouli oil, dark | 10 |
| Coumarin | 40 |
| Proline-ethyl maltol reaction product of Example 6 | 2 |
| Diethyl phthalate | 150 |
| | 1000 |

The foregoing mixture is given a powerful caramel-like sweet "baked" topnote as a result of adding the two parts of the proline-ethyl maltol reaction product thereto.

What is claimed is:

1. A flavoring composition comprising the product obtained by heating proline with at least one cyclic α-diketone and an auxiliary flavoring material.

2. A flavoring composition comprising as defined in claim 1, wherein said cyclic α-diketone is maltol, 2-hydroxy-3-methyl-2-cyclopenten-1-one, 4-hydroxy - 2,5 - dimethyl - 2(H) - furan - 3 - one, ethyl maltol, 3 - ethyl-2-hydroxy-2-cyclopenten - 1 - one, 5 - methyl - 4 - hydroxy-2(H)-furan-3-one, or 2-hydroxy-3-propyl-2-cyclopenten-1-one.

3. A flavoring composition as defined in claim 1, wherein the cyclic α-diketone is 4-hydroxy-2,5-dimethyl-2(H)-furan-3-one.

4. A flavoring composition as defined in claim 1, wherein the cyclic α-diketone is maltol.

5. A flavoring composition as defined in claim 1, wherein the cyclic α-diketone is ethyl maltol.

6. A flavoring composition as defined in claim 1, wherein the cyclic α-diketone is cyclotene.

7. A flavoring composition as defined in claim 1, wherein the cyclic α-diketone is ethyl cyclotene.

8. A process for altering the flavor of a foodstuff which comprises associating with said foodstuff a small but effective amount of the product obtained by heating proline with at least one cyclic α-diketone.

9. A process as defined in claim 8, wherein said cyclic α-diketone is maltol, 2-hydroxy-3-methyl-2-cyclopenten-1-one, 4-hydroxy-2,5-dimethyl-2(H)-furan-3-one, ethyl maltol, 3-ethyl-2-hydroxy-2-cyclopenten - 1 - one, 5-methyl-4-hydroxy-2(H)-furan-3-one, or 2 - hydroxy - 3-propyl-2-cyclopenten-1-one.

10. A process as defined in claim 9, wherein said cyclic α-diketone is 4-hydroxy-2,5-dimethyl-2(H)-furan-3-one.

11. A process as defined in claim 9, wherein said cyclic α-diketone is maltol.

12. A process as defined in claim 9, wherein said cyclic α-diketone is ethyl maltol.

References Cited

UNITED STATES PATENTS

| | | | |
|---|---|---|---|
| 2,934,435 | 4/1960 | May | 99—140 |
| 3,304,184 | 2/1967 | Wiseblatt | 99—140 X |
| 3,576,014 | 4/1971 | Meyrin et al. | 99—140 X |
| 3,446,629 | 5/1969 | Stephens et al. | 99—140 |
| 3,455,702 | 7/1969 | Willhalm et al. | 99—140 |
| 3,478,015 | 11/1969 | Onishi et al. | 99—140 X |
| 3,425,840 | 2/1969 | Hunter et al. | 99—140 X |

MORRIS O. WOLK, Primary Examiner

W. BOVEE, Assistant Examiner

U.S. Cl. X.R.

99—83, 90; 131—17; 252—522